United States Patent
Stephens et al.

(10) Patent No.: US 9,313,811 B2
(45) Date of Patent: Apr. 12, 2016

(54) WIRELESS STATION AND METHODS FOR TOF POSITIONING USING REVERSE-DIRECTION GRANT

(71) Applicant: Intel Corporation, Santa Clara, CA (US)

(72) Inventors: Adrian P. Stephens, Cottenham (GB); Yuval Amizur, Kfar-Saba (IL); Jonathan Segev, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,444

(22) PCT Filed: Jun. 28, 2013

(86) PCT No.: PCT/US2013/048628
§ 371 (c)(1),
(2) Date: Dec. 6, 2013

(87) PCT Pub. No.: WO2014/099030
PCT Pub. Date: Jun. 26, 2014

(65) Prior Publication Data
US 2014/0269549 A1    Sep. 18, 2014

Related U.S. Application Data

(60) Provisional application No. 61/738,716, filed on Dec. 18, 2012.

(51) Int. Cl.
*H04W 74/08* (2009.01)
*H04L 1/16* (2006.01)

(52) U.S. Cl.
CPC ......... *H04W 74/0891* (2013.01); *H04L 1/1664* (2013.01); *H04L 1/1678* (2013.01)

(58) Field of Classification Search
CPC . H04W 84/12; H04W 72/0406; H04W 72/14; H04W 74/002; H04L 2025/03802; H04L 1/1664; H04L 1/1678; H04J 3/0605
See application file for complete search history.

(56) References Cited

U.S. PATENT DOCUMENTS

| | | | |
|---|---|---|---|
| 7,706,397 B2 * | 4/2010 | Trainin et al. | 370/445 |
| 8,630,272 B2 * | 1/2014 | Park et al. | 370/338 |

(Continued)

FOREIGN PATENT DOCUMENTS

| | | |
|---|---|---|
| CN | 104823386 A | 8/2015 |
| WO | WO-2014099030 A1 | 6/2014 |

OTHER PUBLICATIONS

"International Application Serial No. PCT/US2013/048628, International Preliminary Report on Patentability mailed Jul. 2, 2015", 6 pgs.

(Continued)

*Primary Examiner* — Ayaz Sheikh
*Assistant Examiner* — Debebe Asefa
(74) *Attorney, Agent, or Firm* — Schwegman Lundberg & Woessner, P.A.

(57) ABSTRACT

Embodiments of a communication station (STA) and method for time-of-flight (ToF) positioning in a wireless network are generally described herein. In some embodiments, an initiating station may transmit a message M1 carrying a high-throughput control (HTC) field that includes a reverse direction grant (RDG) bit. The RDG indication grants permission to a responding station to send information back to the initiating station. The message M1 may be a timing measurement action frame. An ACK frame may be received from the responding station to acknowledge receipt of the message M1. The ACK frame may optionally carry an HTC field that includes a more PPDU indication to indicate whether a PPDU (e.g., contained in message M2) is to follow the ACK frame. The message M2 may be received from the responding station and may include timing measurement information from a current and/or one or more previous ToF message exchanges.

28 Claims, 3 Drawing Sheets

(56) References Cited

U.S. PATENT DOCUMENTS

| | | |
|---|---|---|
| 8,976,741 B2* | 3/2015 | Wentink .................. 370/329 |
| 2010/0008270 A1 | 1/2010 | Ahn et al. |
| 2010/0040033 A1 | 2/2010 | Xhafa et al. |
| 2010/0150117 A1 | 6/2010 | Aweya et al. |
| 2010/0165959 A1 | 7/2010 | Park et al. |
| 2012/0093134 A1 | 4/2012 | Zuniga et al. |

OTHER PUBLICATIONS

"International Application Serial No. PCT/US2013/048628, International Search Report mailed Oct. 15, 2013", 3 pgs.

"International Application Serial No. PCT/US2013/048628, Written Opinion mailed Oct. 15, 2013", 4 pgs.

* cited by examiner

WIRELESS STATION AND METHODS FOR TOF POSITIONING USING REVERSE-DIRECTION GRANT

PRIORITY CLAIM

This application is a U.S. National Stage Filing under 35 U.S.C. 371 from International Application No. PCT/US2013/048628, filed Jun. 28, 2013, which claims the benefit of priority to U.S. Provisional Patent Application Ser. No. 61/738,716, filed Dec. 18, 2012, all of which are incorporated herein by reference in their entireties and made a part hereof.

TECHNICAL FIELD

Embodiments pertain to wireless networks. Some embodiments relate to wireless networks that operate in accordance with one of the IEEE 802.11 standards including the IEEE 802.11-2012 standards. Some embodiments relate to time-of-flight (ToF) positioning. Some embodiments relate to location determination. Some embodiments relate to indoor navigation.

BACKGROUND

Outdoor navigation and positioning has been widely deployed thanks to the development of various global navigation-satellite-systems (GNSS) as well as various cellular systems. Indoor navigation and positioning differs from the outdoor navigation and positioning since the indoor environment does not enable the reception of signals from satellites or cellular base stations as well as in the outdoor environment. As a result, accurate and real-time indoor navigation and positioning are difficult to achieve.

Thus there are general needs for improved navigation and positioning methods. There are also general needs for improved navigation and positioning methods suitable for indoor environments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
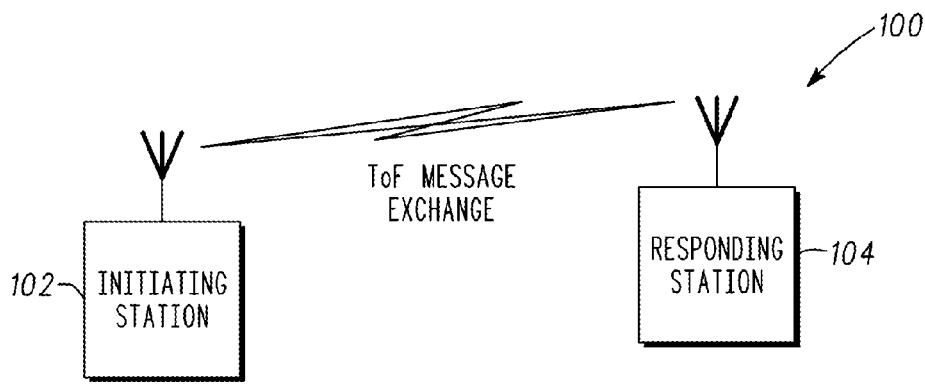
FIG. 1 illustrates a wireless network in accordance with some embodiments.

FIG. 1 illustrates various network elements of a wireless network in accordance with some embodiments. Wireless network 100 includes a plurality of communication stations (STAs) and one or more access points (APs) which may communicate in accordance with IEEE 802.11 communication techniques. The communication stations may be mobile devices that are non-stationary and do not have fixed locations. The one or more access points may be stationary and have fixed locations. The stations may include an initiating station 102 and one or more responding stations 104. The initiating station 102 may be a communication station that initiates ToF positioning with the responding station 104 to determine its location. The ToF positioning procedure may include the exchange of messages including the exchange of a message M1 and a message M2, as described in more detail below.

In some embodiments, a reverse direction (RD) mechanism may be used. In these embodiments, an initiator (such as an initiating station 102) is able choose whether or not to use an IEEE 802.11 reverse direction (RD) grant for ToF measurements (e.g., by setting a RD indicator or bit). In some of these embodiments that use the RD mechanism, a responder (such as a responding station 104) can choose whether to use an optimized sequence for ToF message exchange by setting certain one or more signaling bits. In some of these embodiments that use the RD mechanism, a responder can choose whether or not to aggregate the ACK and the message M2. These embodiments are described in more detail below.

In some embodiments, the responder can choose whether to use current or previous timing measurement information. In these embodiments, the responder can choose whether to use a current or previous measurement by setting a bit in a message M2 or by the inclusion of dialog tokens that identify a specific message M1 verses the reported timing measurement information (e.g., a (t3−t2) value). These embodiments are described in more detail below.

Some embodiments may eliminate the use of an ACK frame for acknowledging receipt of the message M2. Some of these embodiments provide for repeated transmissions of timing measurement information (e.g., a (t3−t2) value) to help counteract the loss of the ACK to the message M2. Some of these embodiments may cause a final ACK not be generated through the use of an 'Action No ACK' frame. These embodiments are discussed in more detail below.

Some embodiments provide for mutual ToF discovery using two PPDUs per measurement. In these embodiments, message M1 may be arranged to carry a timing measurement information of the initiating station (e.g., a (t1−t4) value) allowing both the initiator and the responder to determine ToF information. In some of these embodiments, message M1 may be arranged to carry a dialog token related to timing measurement information of the initiating station (e.g., a (t1−t4) value) to allow the responder to determine that stored timing measurement information (e.g., a (t3−t2) value) corresponds to the same measurement.

In some embodiments, the initiating station 102 may be a positioning station and may determine its location relative to one or more responding stations (e.g., cooperating stations and/or one or more access points). The cooperating stations may be either IEEE 802.11 configured communication stations (STAs) or APs. In other embodiments, the initiating 102 may determine its location in geo-coordinates. In some embodiments, the responding station may be able to determine its location either in relative or in geo-coordinates.

Figure 2:
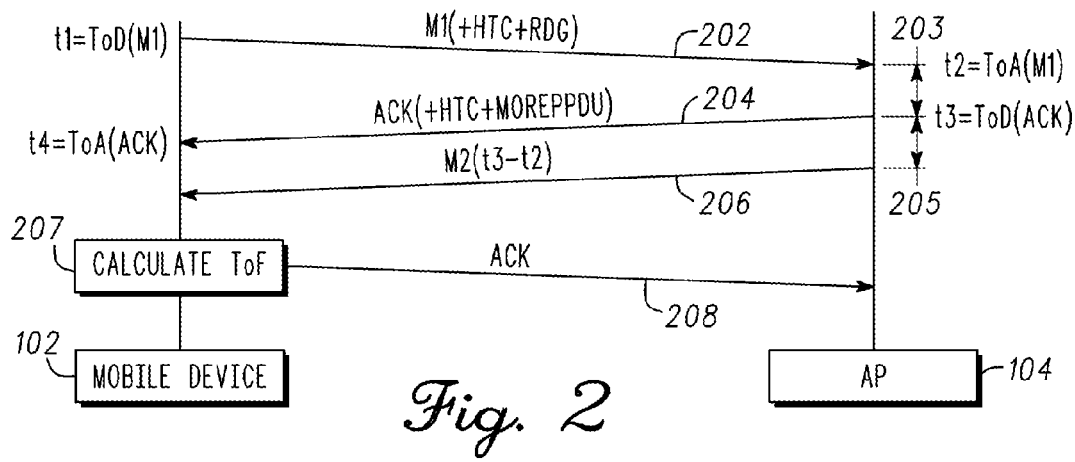
FIG. 2 illustrates a procedure for time-of-flight (ToF) positioning using a reverse-direction grant (RDG) in accordance with some embodiments.

FIG. 2 illustrates a procedure for ToF positioning using RDG in accordance with some embodiments. As illustrated in FIG. 2, the initiating station 102 may be arranged to transmit a message M1 202 carrying a high-throughput control (HTC) field. The HTC field may include a reverse direction grant (RDG) indication. The RDG indication may grant permission to the responding station 104 to send information back to the initiating station 102 during a transmission opportunity (TXOP) of the initiating station 102. The message M1 202 may be a timing measurement action frame. The timing measurement action frame may be a unicast management frame. In some embodiments, the RDG indication may be an RDG bit.

The initiation station 102 may receive an ACK frame 204 from the responding station 104 during the TXOP to acknowledge receipt of the message M1 202. The ACK frame 204 may optionally carry an HTC field that includes an indicator to indicate whether a separate frame is to follow the ACK frame 204 during the TXOP. The initiating station 102 may also receive a message M2 206 from the responding station 104 during the TXOP. The message M2 206 may include timing measurement information from either a current or a previous ToF message exchange. As discussed in more detail below, the message M2 206 may include timing measurement information from a current and/or one or more previous ToF message exchanges.

The indicator included in the HTC field of ACK frame 204 may comprise one or more signaling bits to indicate whether a separate frame is to follow the ACK frame 204. In some embodiments, the indicator may comprise a more PPDU indication to indicate whether or not a separate frame (contained in a separate PPDU) is to follow the ACK frame 204 during the TXOP. In some embodiments, the indicator may comprise a more PPDU bit.

In these embodiments, when the initiating station 102 sets the RDG indication in the message M1 202, the responding station 104 is granted permission to optionally send information back during the TXOP. For example, instead of a conventional ACK frame, the responding station 104 may send information back during the TXOP which may include an ACK frame with additional fields. The TXOP may have been obtained by the initiating station 102 prior to transmitting message M1 202. In these embodiments, the message M2 206 may correspond to the separate frame that was indicated to follow the ACK frame 204. The separate frame may include a packet protocol data unit such as a physical-layer convergence protocol (PLCP) data unit (i.e., a PPDU) although this is not a requirement.

In these embodiments, message M1 202, ACK frame 204, the message M2 206, and ACK frame 208 may be sent during the TXOP that has been obtained by the initiating station. Since the ToF message exchange takes place with the TXOP, only a single channel access is required thus avoiding delay and eliminating collisions.

In some embodiments, the RDG signaling (e.g., using RDG indication) and the more PPDU signaling (e.g., using a more PPDU indication) may occur in the same field (e.g., the HTC field). The signaling may be distinguished depending on whether the transmitting station is the current TXOP holder. For example, if the transmitting station is the current TXOP holder (i.e., the initiating station 102), the signaling would be interpreted as an RDG indication. If the transmitting station is not the current TXOP holder (i.e., the responding station 104), the signaling would be interpreted as a more PPDU indication.

As discussed in more detail below, a sequence number or token may be used to indicate whether the timing measurement information included in message M2 206 is for a current or a previous ToF message exchange Various embodiments disclosed herein may provide for a reduction in the number of channel access attempts and frames. Furthermore, these embodiments help cope with hardware that takes a long time to make a timing measurements.

In some embodiments, the message M1 202 may be a timing measurement action frame in accordance with 802.11 (v), while in some other embodiments that provide finer measurement resolution; the message M1 202 may be a fine-timing measurement action frame in accordance with 802.11REVmc. The message M1 202 may refer to an M1 frame and the message M2 206 may refer to an M2 frame. In some embodiments, the message M1 202 may be used to initiate ToF positioning with another station.

In some embodiments, the message M1 may be a first timing measurement action frame and the message M2 may be a second timing measurement action frame. In some embodiments, the timing measurement action frames may be timing measurement frames. In some embodiments, a Media Access Control (MAC) Sublayer Management Entity (MLME) constructs the timing measurement frames.

In some embodiments, the timing measurement information may be a t2 value and a t3 value (i.e., two values) or a t3−t2 value (i.e., a single difference value). In these embodiments, the initiating station may be arranged to parse the structure of the message M2 206. By parsing the structure of message M2 206, the initiating station 102 can determine whether the message M2 206 contains either a t2 value and a t3 value (i.e., two values) or a t3−t2 value (i.e., a single difference value). In some of these embodiments, the message M2 206 may include different elements or employ sub-element coding to allow the initiation station to parse the structure of message M2 206.

In some embodiments, t2 may be a time-stamp against a local clock associated with the arrival of message M1 at the responding station 104, and t3 may be a time-stamp against the local clock associated with transmission of message M2 by the responding station 104 (i.e., measured against the same clock as t2). In some embodiments, t1 may be a time-stamp against a local clock associated with the transmission of message M1 by the initiating station 102 and t4 may be a time-stamp against the local clock associated with receipt of the acknowledgement frame that acknowledges receipt of the message M1 (i.e., measured against the same clock as t1).

In some embodiments, the t2 value is the time that the message M1 202 arrived at the responding station 104, and the t3 value is time that the ACK frame 204 is sent by the responding station 104. The inclusion of both t2 value and t3 value may be more optimal as it may allow a particular and more straightforward way to calibrate for difference in the clock rates at the two stations for increased ToF accuracy. Furthermore, inclusion of a single value (t3−t2) may allow the relative timing drift between the recipient and the responding stations to be tracked for increased ToF accuracy.

In some embodiments, when the more PPDU indication in the HTC field of the ACK frame 204 indicates that a separate frame (e.g., containing a PPDU) is to follow, the message M2 206 may be the separate frame that follows. In these embodiments, the initiating station 102 may wait for receipt of the message M2 206. When the more PPDU indication in the HTC field of the ACK 204 does not indicate that a PPDU is to follow, the message M2 206 is not sent by the responding station 104 and the initiation station 102 may refrain from waiting for receipt of a message M2 206.

In some embodiments, the initiating station 102 and the responding station 104 may be either mutually associated although this is not a requirement. The stations may be mutually unassociated with each other prior to the ToF message exchange illustrated in FIG. 2.

In FIG. 2, a plus sign ('+') is used to indicate that there is an additional optional field. For example, message M1 202 includes the optional HTC field which may include signaling bits such as the RDG indication. For example, the ACK frame 204 illustrated in FIG. 2 includes the optional HTC field which may include a more PPDU indication, which may be set to one. The RDG indication may include one or more signaling bits.

In some embodiments, the message M2 206 may be in arranged to include a previous-exchange indication to indicate whether the timing measurement information relates to a current or a previous ToF message exchange between the responding station 104 and the initiation station 102 (i.e., an exchange between the same stations).

In some embodiments, when the previous-exchange indication indicates that the timing measurement information relates to the current ToF exchange, the initiating station 102 may calculate a ToF using a t1 value and a t4 value from the current exchange and the timing measurement information (e.g., t3–t2) received in the message M2 206. When the previous-exchange indication indicates that the timing measurement information relates to a previous ToF exchange, the initiating station 102 may calculate a ToF using a t1 value and a t4 value from a previous exchange and the timing measurement information (e.g., t3–t2) received in the message M2 206. In some embodiments, the following equation may be used to determine the ToF: ToF=[(t4–t1)–(t3–t2)]/2, although the scope of the embodiments is not limited in this respect.

In some embodiments, the previous-exchange indication that may be included in M2 206 comprises a one-bit flag. In some embodiments, the previous-exchange indication may indicate whether the timing measurement information relates to a current or a previous exchange. In some embodiments, the previous-exchange indication may comprise a previous exchange flag.

In some embodiments, the message M1 202 may be arranged to further include a dialog token that indicates a specific instance of a timing measurement action frame (i.e., either the current or a previous instance of a message M1). The previous-exchange indication included in the message M2 206 may comprise the dialog token from the specific instance of the timing measurement action frame from which the timing measurement information that is included in the message M2 206 had been determined. In some of these embodiments, the dialog token may be an integer that is incremented to indicate specific instances of the message M1. The specific instance of a message M1 may be any of several prior instances of a message M1 that is a timing measurement action frame.

In some embodiments, the previous instance of a message M1 may be part of a prior message exchange that occurred within the current TXOP obtained by the initiating station 102, although this is not a requirement as the message exchange may have occurred in a previous TXOP (e.g. a periodic 1 s range fix). The use of previous instances of the (t4–t1) value may provide for adaptive support of fast or slow measurement of t2, t3 at the responding station 104 (or access point (AP)), thus enabling better use of the computational resources of the responding station 104. In some embodiments, the prior message exchange may have occurred within the current TXOP when taking place in a rapid burst of measurements to produce a single range fix.

In some embodiments, when the message M2 206 may include a dialog token indicating a specific instance of a prior message M1, the initiating station 102 may calculate a ToF (box 207) using a (t4–t1) value corresponding to the specific instance of the message M1 indicated in the dialog token. In these embodiments, the initiating station 102 may only generate a ToF result when the dialog token received in the message M2 matches a dialog token of a recorded (t4–t1) value.

In some embodiments, when the more PPDU indication in the HTC field carried by the ACK frame 204 is set to one, the more PPDU indication may indicate that that a PPDU will follow the ACK frame 204 after a short-interframe space (SIFS) 205, the PPDU that is to follow being the message M2 206. When the more PPDU indication is set to zero, the more PPDU indication may indicate that a PPDU will not follow the ACK frame 204 and message M2 206 will not be sent.

In some embodiments, when the ACK frame 204 includes the HTC field, the ACK frame 204 may be contained in a control wrapper frame. In some embodiments, since the ACK frame 204 includes an optional HTC field, it may be contained in a control wrapper frame to avoid issues with legacy systems (e.g., so that it is readable by legacy systems).

In some embodiments, the responding station 104 may be arranged to transmit the ACK frame 204 after a SIFS 203 after receipt of the message M1 202. The responding station 104 may be arranged to transmit the message M2 206 after no more than a SIFS 205 after transmission of the ACK frame 204. In some alternate embodiments, the responding station 104 may be arranged to transmit the message M2 206 after a no more than a point coordination function (PCF) interframe spacing (PIFS) after transmission of the ACK frame 204.

In accordance with embodiments, since message M2 206 is sent no later than a predetermined time after the transmission of ACK frame 204, the initiation station 102 knows when message M2 206 will arrive is does not need to wait an indeterminable amount of time. Furthermore, the initiating station 102 can reliably go to sleep or go to a different channel without having to wait an arbitrary period of time for receipt of message M2 206. This is particular beneficial if message M2 206 is not transmitted or lost.

In some embodiments, the initiating station 102 may be a mobile station and the responding station 104 may be an AP, although the scope of the embodiments is not limited in this respect. In other embodiments, the initiating station 102 may be an AP and the responding station 104 may be a mobile station. In some embodiments, the initiating station 102 and the responding station 104 may be any two IEEE 802.11 configured stations. In some peer-to-peer (P2P) embodiments, the initiating station 102 and the responding station 104 may be two peer non-AP stations that may communicate in accordance with a direct link setup (DLS) or tunneled DLS (TDLS) protocol.

In some embodiments, the initiating station 102 may be arranged to send an ACK frame 208 to the responding station 104 to acknowledge receipt of the message M2 206. In other embodiments, no acknowledgement frame 208 is sent. In these other embodiments, the message M2 may be an Action No ACK management frame.

Figure 3:
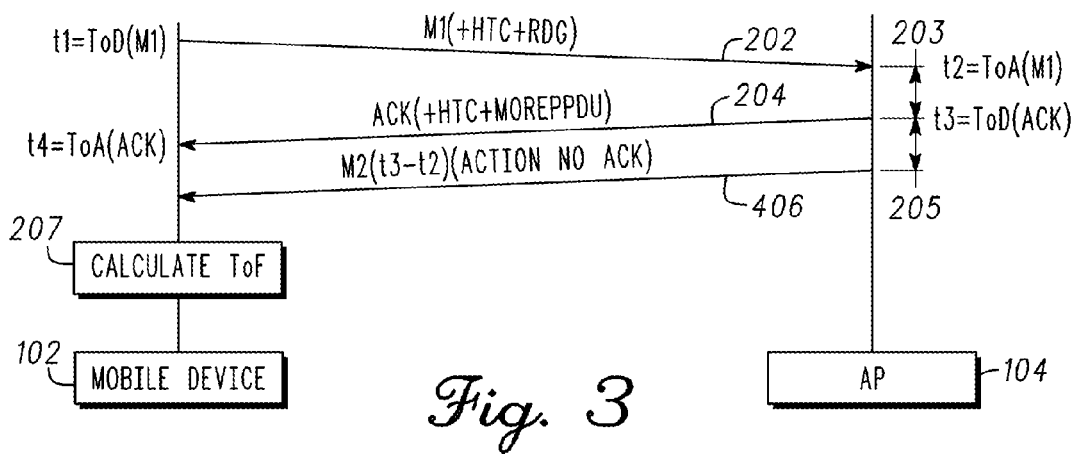
FIG. 3 illustrates a procedure for ToF positioning without a final acknowledgement (ACK) frame in accordance with some other embodiments.

FIG. 3 illustrates a procedure for ToF positioning without a final acknowledgement frame in accordance with some other embodiments. In these embodiments, no acknowledgement frame, such as acknowledge frame 208 (FIG. 2) is sent. In these other embodiments, the message M2 306 may be an Action No ACK management frame.

In these embodiments, when the message M2 306 is an Action No ACK management frame, the initiating station 102 will refrain from sending an ACK frame to acknowledge the message M2. The use of sending an ACK frame 208 to the responding station 104 may be of little value to a ToF message exchange since the data in message M2 may expire quickly. Furthermore, the responding station 104 cannot always be sure if the initiating station 102 is on channel and awake to receive the message M2 206. In the embodiments illustrated in FIG. 3, since no ACK frame 208 (FIG. 2) is transmitted, retransmissions of the message M2 by the responding station would not occur.

Figure 4:
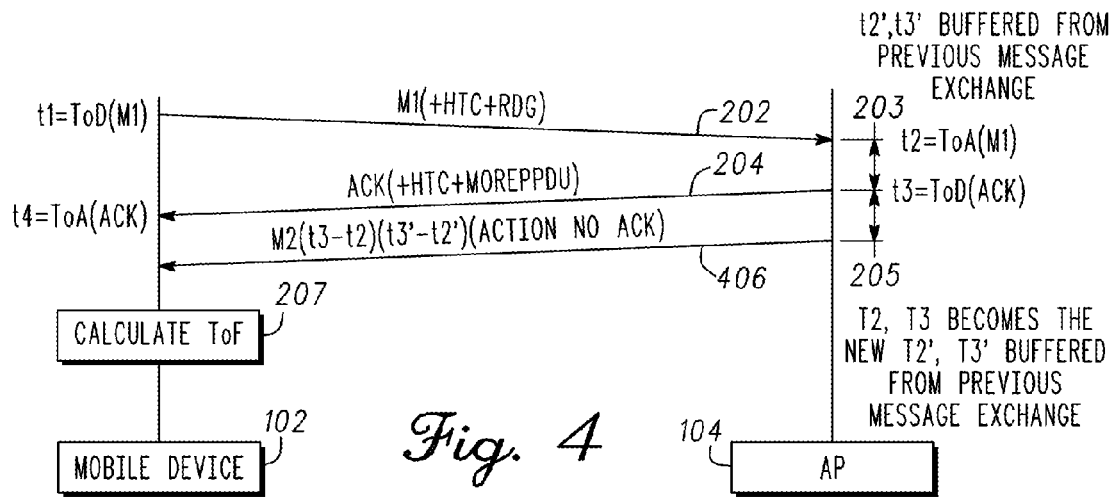
FIG. 4 illustrates a procedure for ToF positioning in which a message M2 includes additional timing measurement information in accordance with some other embodiments.

FIG. 4 illustrates a procedure for ToF positioning in which a message M2 includes additional timing measurement information in accordance with some other embodiments. In these embodiments, when the message M2 406 (FIG. 4) is an Action No ACK management frame, the message M2 406 may be arranged to include the timing measurement information from a current ToF message exchange and one or more indicated previous ToF message exchanges. This provides additional robustness since no ACK frame, such as ACK frame 208 (FIG. 2)) is transmitted by the responding station 104.

In some of these embodiments, the message M2 406 may include the latest or more recent timing measurement information (e.g., from the current and the next most recent ToF message exchange). As illustrated in FIG. 4, current timing measurement information is illustrated the message M2 406 as (t3–t2) and the timing measurement information from the previous exchange is illustrated the message M2 406 as (t3'–t2'). These embodiments may result in increasing the reliability of the information in the message M2 406 since no ACK frame, such as ACK frame 208, is to be transmitted.

In the example illustrated in FIG. 4, t2' and t3' may be buffered from the previous message exchange. For the next message exchange t2 and t3 become the new t2' and t3' respectively buffered from the previous message exchange.

In some embodiments, this repetition like code scheme may be extended to almost any depth n (i.e., (t2', t3') ... (t2", t3")) and may be arranged to be time sensitive such that t2', t3' ... (t2', t3') are kept only up to a certain duration from their original M2 transmission frame. The duration may be fixed, dynamic or semi-dynamic, advertised, or not. The duration may be the result of local load (e.g., due to internal buffer size). In some embodiments, message M2 406 may identify or indicate which recent ToF message exchange the timing measurement information is associated with.

Figure 5:
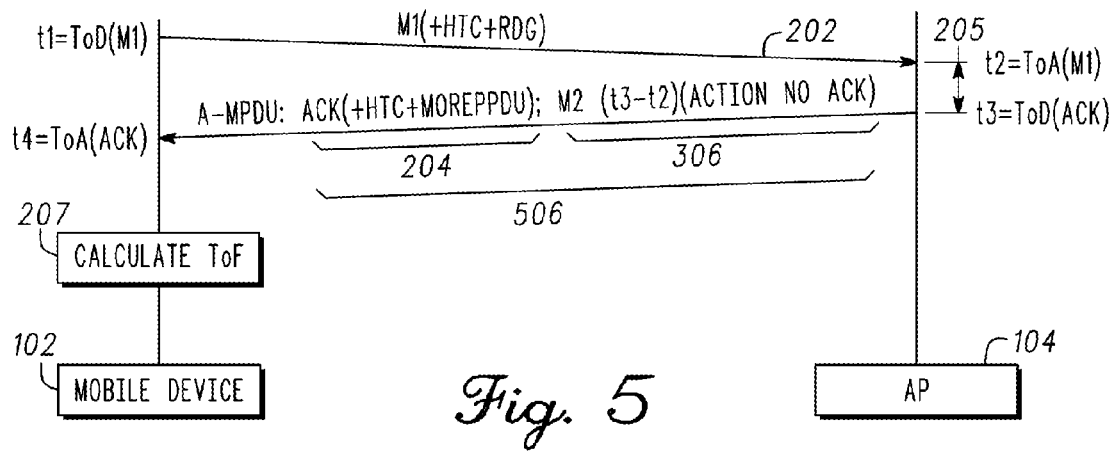
FIG. 5 illustrates a procedure for ToF positioning using an aggregated media-access-control protocol data unit (A-MPDU) in accordance with some other embodiments.
Figure 6:
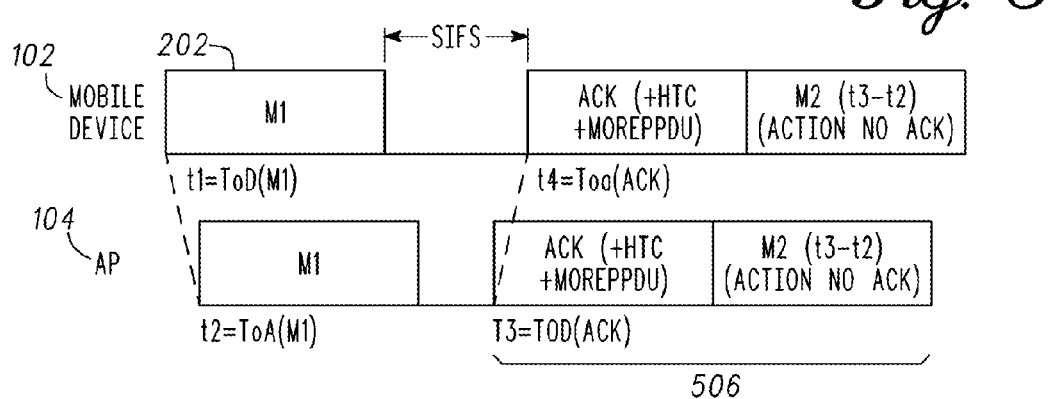
FIG. 6 illustrates the use of an A-MPDU in accordance with some embodiments.

FIG. 5 illustrates a procedure for ToF positioning using an A-MPDU in accordance with some other embodiments. In these embodiments, the ACK frame 204 and the message M2 306 comprises an aggregated media-access-control protocol data unit (A-MPDU) 506. In these embodiments, the ACK to the message M1 202 (i.e., ACK frame 204) and the message M2 (206, 306 or 406) may be included as part of a single A-MPDU 506 transmitted by the responding station 104. In these embodiments, the more PPDU indication in the HTC field of ACK frame 204 may be set (e.g., to zero) to indicate that a separate frame will not follow since both the ACK frame 204 and the message M2 306 are part of a single PPDU (i.e., A-MPDU 506). The A-MPDU 506 may be configured in accordance the IEEE 802.11-2012 standard, for example. FIG. 6 further illustrates the use of an A-MPDU 506 to transmit an ACK to message M1 202 and a message M2.

Figure 7:
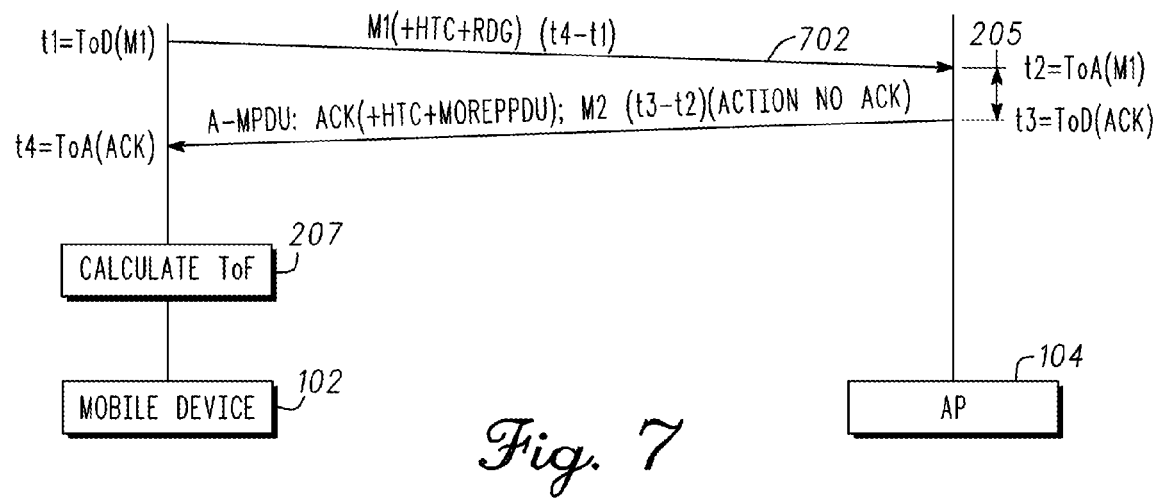
FIG. 7 illustrates a procedure for ToF positioning in accordance with some other embodiments.

FIG. 7 illustrates a procedure for ToF positioning in accordance with some other embodiments. In these embodiments, the initiating station 102 may configure the message M1 702 (FIG. 7) to further include timing measurement information (e.g., a single difference value (t4–t1) or two values (t4, t1)) and a dialog token related to the included timing measurement information. The dialog token may indicate a ToF message exchange to which the timing measurement information is associated with. These embodiments that include initiating station timing measurement information (e.g., (t4–t1) or (t4, t1)) in the message M1 702 may allow both the responding station 104 as well as the initiating station 102 to calculate a ToF. In some embodiments, the responding station 104 may use the dialog token to check that previous recorded t2, t3 values relate to the same M1 frame before using it to determine a ToF.

Figure 8:
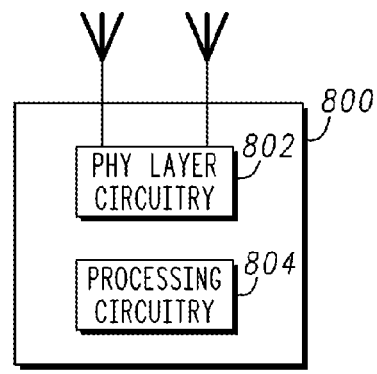
FIG. 8 is a functional diagram of a communication station in accordance with some embodiments.

FIG. 8 is a functional diagram of a communication station in accordance with some embodiments. Communication station 800 may be suitable for use as either a responding station, such as responding station 104 (FIG. 1), or an initiating station, such as initiating station 102 (FIG. 1). Communication station 800 may include physical layer circuitry 802 for transmitting and receiving messages (e.g., frames) as described herein and processing circuitry 804 for performing the various operations described herein.

In some embodiments, the physical layer circuitry 802 and the processing circuitry 804 may be configured to transmit a message M1 202 carrying HTC field, receive an ACK frame 204 to acknowledge receipt of the message M1 202, and receive a message M2 206 from the responding station 104. The message M2 206 includes timing measurement information from either a current or a previous ToF message exchange.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the communication station 800 may include one or more antennas. The antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although communication station 800 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

In one example, method for time-of-flight (ToF) positioning performed by an initiating station, the method comprises:

transmitting a message M1 carrying a high-throughput control (HTC) field, the HTC field including a reverse direction grant (RDG) indication, the RDG indication granting permission to a responding station to send information back to the initiating station, the message M1 being a timing measurement action frame; receiving an acknowledgement (ACK) frame to acknowledge receipt of the message M1, the ACK frame carrying an HTC field that includes an indication to indicate whether a separate frame is to follow the ACK frame; and receiving a message M2 from the responding station, the message M2 including timing measurement information from at least at one of a current and a previous ToF message exchange.

In one example, the indication in the HTC field of the ACK frame is a more physical-layer convergence protocol (PLCP) data unit (PPDU) indication, the timing measurement information comprising either a t2 value and t3 or a t3−t2 value, and the t2 value is a time-stamp associated with the arrival of the message M1 at the responding station and the t3 value is a time-stamp associated with transmission of the message M2 by the responding station.

In one example, when the indication in the HTC field of the ACK frame indicates that a PPDU is to follow, the message M2 comprises the PPDU and the method includes the initiating station waiting for receipt of the message M2; and when the indication in the HTC field of the ACK does not indicate that a PPDU is to follow, the message M2 is not sent by the responding station and the method includes the initiation station refraining from waiting for receipt of a message M2.

In one example, the message M2 in arranged to include a previous-exchange indication to indicate whether the timing measurement information relates to a current or a previous ToF message exchange between the responding station and the initiating station.

In one example, when the previous-exchange indication indicates that the timing measurement information relates to the current ToF exchange, the method further includes the initiating station calculating a ToF using a t1 value and a t4 value from the current exchange and the timing measurement information received in the message M2, when the previous-exchange indication indicates that the timing measurement information relates to a previous ToF exchange, the method further includes the initiating station calculating a ToF using the t1 value and the t4 value from a previous exchange and the timing measurement information received in the message M2, the t1 value is a time-stamp associated with transmission of message M1 by the initiating station and the t4 value is a time-stamp associated with receipt of the acknowledgement frame that acknowledges receipt of the message M1.

In one example, the previous-exchange indication comprises a one-bit flag.

In one example, the message M1 is arranged to further include a dialog token that indicates a specific instance of a timing measurement action frame, and the previous-exchange indication comprises the dialog token from the specific instance of a timing measurement action frame from which the timing measurement information that is included in the message M2 had been determined.

In one example, when the message M2 includes a dialog token indicating a specific instance of a prior message M1, the method includes the initiating station calculating a ToF using a (t4−t1) value corresponding to the specific instance of the message M1 indicated in the dialog token.

In one example, when the more PPDU indication in the HTC field carried by the ACK frame is set to one, the more PPDU indication indicates that that a PPDU will follow the ACK frame after a short-interframe space (SIFS), the PPDU that is to follow being included in the message M2.

In one example, when the ACK frame includes the HTC field, the ACK frame is contained in a control wrapper frame.

In one example, when the message M2 is an Action No ACK management frame, the method includes refraining, by the initiating station, from sending an ACK frame to acknowledge the message M2.

In one example, when the message M2 is an Action No ACK management frame, the message M2 is arranged to include the timing measurement information from both a current ToF message exchange and a previous ToF message exchange.

In one example, the ACK frame and the message M2 comprise a single aggregated media-access-control protocol data unit (A-MPDU).

In one example, the initiating station configuring the message M1 to further include timing measurement information and a dialog token related to the included timing measurement information, the dialog token indicating a ToF message exchange which the timing measurement information is associated.

In one example, a communication station is arranged to perform time-of-flight (ToF) positioning, the station comprising physical layer circuitry and processing elements to: transmit a message M1 carrying a high-throughput control (HTC) field, the HTC field including a reverse direction grant (RDG) indication, the RDG indication granting permission to a responding station to send information back to the initiating station, the message M1 being a timing measurement action frame; receive an acknowledgement (ACK) frame to acknowledge receipt of the message M1, the ACK frame carrying an HTC field that includes an indication to indicate whether a separate frame is to follow the ACK frame; and receive a message M2 from the responding station, the message M2 including timing measurement information from either a current or a previous ToF message exchange In one example, the indication in the HTC field of the ACK frame is a more physical-layer convergence protocol (PLCP) data unit (PPDU) indication, when the indication in the HTC field of the ACK frame indicates that a PPDU is to follow, the message M2 comprises the PPDU and the initiating station is arranged to wait for receipt of the message M2.

In one example, the message M2 in arranged to include a previous-exchange indication to indicate whether the timing measurement information relates to a current or a previous ToF message exchange between the responding station and the initiating station.

In one example, when the message M2 is an Action No ACK management frame, the initiating station is arranged to refrain from sending an ACK frame to acknowledge the message M2 and the message M2 is arranged to include the timing measurement information from both a current ToF message exchange and a previous ToF message exchange. In one example, the ACK frame and the message M2 comprise a single aggregated media-access-control protocol data unit (A-MPDU).

In one example, a method for positioning comprising: transmitting a first timing measurement action frame carrying a high-throughput control (HTC) field, the HTC field including a reverse direction grant (RDG) indication, the RDG indication granting permission to a responding station to send information back to an initiating station; and receiving a second timing measurement action frame from the responding station when an HTC field in an acknowledgement (ACK) frame indicates that a separate frame is to follow the ACK frame, the second timing measurement action frame including timing measurement information from at least at one of a current and a previous message exchange.

In one example, when the second timing measurement action frame is an Action No ACK management frame, the second timing measurement action frame is arranged to include the timing measurement information from both a current time-of-flight (ToF) message exchange and at least one previous ToF message exchange.

In one example, when the second timing measurement action frame is an Action No ACK management frame, the method includes refraining, by the initiating station, from sending an ACK frame to acknowledge the second timing measurement action frame.

In one example, the ACK frame and the second timing measurement action frame comprise an aggregated media-access-control protocol data unit (A-MPDU), the ACK frame to acknowledge receipt of the first timing measurement action frame prior to receiving the second timing measurement action frame.

In one example, the second timing measurement action frame includes a previous-exchange indication to indicate whether the timing measurement information relates to a current or a previous ToF message exchange between the responding station and the initiating station.

In one example, the ACK frame carries an HTC field that includes an indication to indicate whether a separate frame is to follow the ACK frame, the separate frame being second timing measurement action frame.

In one example, a non-transitory computer-readable storage medium that stores instructions for execution by one or more processors to perform operations comprising: transmitting a first timing measurement action frame carrying a high-throughput control (HTC) field, the HTC field including a reverse direction grant (RDG) indication, the RDG indication granting permission to a responding station to send information back to an initiating station; and receiving a second timing measurement action frame from the responding station when an HTC field in an acknowledgement (ACK) frame indicates that a separate frame is to follow the ACK frame, the second timing measurement action frame including timing measurement information from at least at one of a current and a previous message exchange In one example, when the second timing measurement action frame is an Action No ACK management frame, the second timing measurement action frame is arranged to include the timing measurement information from both a current time-of-flight (ToF) message exchange and at least one previous ToF message exchange.

In one example, the ACK frame and the second timing measurement action frame comprise an aggregated media-access-control protocol data unit (A-MPDU), the ACK frame to acknowledge receipt of the first timing measurement action frame prior to receiving the second timing measurement action frame, and the second timing measurement action frame includes a previous-exchange indication to indicate whether the timing measurement information relates to a current or a previous ToF message exchange between the responding station and the initiating station.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for time-of-flight (ToF) positioning performed by an initiating station, the method comprising:
   transmitting a message M1 carrying a high-throughput control (HTC) field, the HTC field including a reverse direction grant (RDG) indication, the RDG indication granting permission to a responding station to send information back to the initiating station, the message M1 being a timing measurement action frame;
   receiving an acknowledgement (ACK) frame to acknowledge receipt of the message M1, the ACK frame carrying an HTC field that includes an indication to indicate whether a separate frame is to follow the ACK frame; and
   receiving a message M2 from the responding station, the message M2 including timing measurement information from at least at one of a current and a previous ToF message exchange.

2. The method of claim 1 wherein the indication in the HTC field of the ACK frame is a more physical-layer convergence protocol (PLCP) data unit (PPDU) indication,
   wherein the timing measurement information comprising either a t2 value and t3 or a t3–t2 value, and
   wherein the t2 value is a time-stamp associated with the arrival of the message M1 at the responding station and the t3 value is a time-stamp associated with transmission of the message M2 by the responding station.

3. The method of claim 2 wherein when the indication in the HTC field of the ACK frame indicates that a PPDU is to follow, the message M2 comprises the PPDU and the method includes the initiating station waiting for receipt of the message M2; and
   wherein when the indication in the HTC field of the ACK does not indicate that a PPDU is to follow, the message M2 is not sent by the responding station and the method includes the initiation station refraining from waiting for receipt of a message M2.

4. The method of claim 3 wherein the message M2 in arranged to include a previous-exchange indication to indicate whether the timing measurement information relates to a current or a previous ToF message exchange between the responding station and the initiating station.

5. The method of claim 4 wherein when the previous-exchange indication indicates that the timing measurement information relates to the current ToF exchange, the method further includes the initiating station calculating a ToF using a t1 value and a t4 value from the current exchange and the timing measurement information received in the message M2, wherein when the previous-exchange indication indicates that the timing measurement information relates to a previous ToF exchange, the method further includes the initiating station calculating a ToF using the t1 value and the t4 value from a previous exchange and the timing measurement information received in the message M2, wherein the t1 value is a time-stamp associated with transmission of message M1 by the initiating station and the t4 value is a time-stamp associated with receipt of the acknowledgement frame that acknowledges receipt of the message M1.

6. The method of claim 4 wherein the previous-exchange indication comprises a one-bit flag.

7. The method of claim 4 wherein the message M1 is arranged to further include a dialog token that indicates a specific instance of a timing measurement action frame, and wherein the previous-exchange indication comprises the dialog token from the specific instance of a timing measurement action frame from which the timing measurement information that is included in the message M2 had been determined.

8. The method of claim 7 wherein when the message M2 includes a dialog token indicating a specific instance of a prior message M1, the method includes the initiating station calculating a ToF using a (t4−t1) value corresponding to the specific instance of the message M1 indicated in the dialog token.

9. The method of claim 4 wherein when the more PPDU indication in the HTC field carried by the ACK frame is set to one, the more PPDU indication indicates that that a PPDU will follow the ACK frame after a short-interframe space (SIFS), the PPDU that is to follow being included in the message M2.

10. The method of claim 9 wherein when the ACK frame includes the HTC field, the ACK frame is contained in a control wrapper frame.

11. The method of claim 1 wherein when the message M2 is an Action No ACK management frame, the method includes refraining, by the initiating station, from sending an ACK frame to acknowledge the message M2.

12. The method of claim 11 wherein when the message M2 is an Action No ACK management frame, the message M2 is arranged to include the timing measurement information from both a current ToF message exchange and a previous ToF message exchange.

13. The method of claim 1 wherein the ACK frame and the message M2 comprise a single aggregated media-access-control protocol data unit (A-MPDU).

14. The method of claim 1 further comprising the initiating station configuring the message M1 to further include timing measurement information and a dialog token related to the included timing measurement information, the dialog token indicating a ToF message exchange which the timing measurement information is associated.

15. A communication station arranged to perform time-of-flight (ToF) positioning, the station comprising physical layer circuitry and processing elements to:

transmit a message M1 carrying a high-throughput control (HTC) field, the HTC field including a reverse direction grant (RDG) indication, the RDG indication granting permission to a responding station to send information back to the initiating station, the message M1 being a timing measurement action frame;

receive an acknowledgement (ACK) frame to acknowledge receipt of the message M1, the ACK frame carrying an HTC field that includes an indication to indicate whether a separate frame is to follow the ACK frame; and receive a message M2 from the responding station, the message M2 including timing measurement information from either a current or a previous ToF message exchange.

16. The communication station of claim 15 wherein the indication in the HTC field of the ACK frame is a more physical-layer convergence protocol (PLCP) data unit (PPDU) indication, wherein when the indication in the HTC field of the ACK frame indicates that a PPDU is to follow, the message M2 comprises the PPDU and the initiating station is arranged to wait for receipt of the message M2.

17. The communication station of claim 16 wherein the message M2 in arranged to include a previous-exchange indication to indicate whether the timing measurement information relates to a current or a previous ToF message exchange between the responding station and the initiating station.

18. The communication station of claim 17 wherein when the message M2 is an Action No ACK management frame, the initiating station is arranged to refrain from sending an ACK frame to acknowledge the message M2 and the message M2 is arranged to include the timing measurement information from both a current ToF message exchange and a previous ToF message exchange.

19. The communication station of claim 18 wherein the ACK frame and the message M2 comprise a single aggregated media-access-control protocol data unit (A-MPDU).

20. A method for positioning comprising:

transmitting a first timing measurement action frame carrying a high-throughput control (HTC) field, the HTC field including a reverse direction grant (RDG) indication, the RDG indication granting permission to a responding station to send information back to an initiating station; and receiving a second timing measurement action frame from the responding station when an HTC field in an acknowledgement (ACK) frame indicates that a separate frame is to follow the ACK frame, the second timing measurement action frame including timing measurement information from at least at one of a current and a previous message exchange.

21. The method of claim 20 wherein when the second timing measurement action frame is an Action No ACK management frame, the second timing measurement action frame is arranged to include the timing measurement information from both a current time-of-flight (ToF) message exchange and at least one previous ToF message exchange.

22. The method of claim 21 wherein when the second timing measurement action frame is an Action No ACK management frame, the method includes refraining, by the initiating station, from sending an ACK frame to acknowledge the second timing measurement action frame.

23. The method of claim 20 wherein the ACK frame and the second timing measurement action frame comprise an aggregated media-access-control protocol data unit (A-MPDU), the ACK frame to acknowledge receipt of the first timing measurement action frame prior to receiving the second timing measurement action frame.

24. The method of claim 23 wherein the second timing measurement action frame includes a previous-exchange indication to indicate whether the timing measurement information relates to a current or a previous ToF message exchange between the responding station and the initiating station.

25. The method of claim 20 wherein the ACK frame carries an HTC field that includes an indication to indicate whether a separate frame is to follow the ACK frame, the separate frame being second timing measurement action frame.

26. A non-transitory computer-readable storage medium that stores instructions for execution by one or more processors to perform operations comprising:

transmitting a first timing measurement action frame carrying a high-throughput control (HTC) field, the HTC field including a reverse direction grant (RDG) indication, the RDG indication granting permission to a responding station to send information back to an initiating station; and receiving a second timing measurement action frame from the responding station when an HTC field in an acknowledgement (ACK) frame indicates that a separate frame is to follow the ACK frame, the second timing measurement action frame including timing measurement information from at least at one of a current and a previous message exchange.

27. The non-transitory computer-readable storage medium of claim 26 wherein when the second timing measurement action frame is an Action No ACK management frame, the second timing measurement action frame is arranged to include the timing measurement information from both a current time-of-flight (ToF) message exchange and at least one previous ToF message exchange.

28. The non-transitory computer-readable storage medium of claim 26 wherein the ACK frame and the second timing measurement action frame comprise an aggregated media-access-control protocol data unit (A-MPDU), the ACK frame to acknowledge receipt of the first timing measurement action frame prior to receiving the second timing measurement action frame, and wherein the second timing measurement action frame includes a previous-exchange indication to indicate whether the timing measurement information relates to a current or a previous ToF message exchange between the responding station and the initiating station.

\* \* \* \* \*